United States Patent [19]
Johnson et al.

[11] Patent Number: 6,077,922
[45] Date of Patent: Jun. 20, 2000

[54] HOLLOW BODIES MADE OF ETHYLENE POLYMER AND METHOD OF MAKING SAME

[75] Inventors: Paul Johnson, Kingwood; Abel Grosjean, Houston, both of Tex.; Benoît Koch, Hannut, Belgium

[73] Assignee: Solvay Polyolefins Europe-Belgium (Societe Anonyme), Brussels, Belgium

[21] Appl. No.: 08/943,152

[22] Filed: Oct. 3, 1997

Related U.S. Application Data

[63] Continuation-in-part of application No. 08/630,959, Apr. 5, 1996, abandoned.

[51] Int. Cl.[7] ............................ C08F 10/02; C08F 210/16
[52] U.S. Cl. .......................................... 526/348.5; 526/352
[58] Field of Search .................................. 526/348.5, 352

[56] References Cited

U.S. PATENT DOCUMENTS

| | | | |
|---|---|---|---|
| 4,444,963 | 4/1984 | McDaniel et al. | 526/100 |
| 5,401,820 | 3/1995 | McDaniel et al. | 526/348.5 |
| 5,624,877 | 4/1997 | Bergmeister et al. | 502/120 |

FOREIGN PATENT DOCUMENTS

| | | |
|---|---|---|
| 0186174 | 7/1986 | European Pat. Off. . |
| 364 636 | 4/1990 | European Pat. Off. . |
| 0457236A2 | 11/1991 | European Pat. Off. . |
| 585 683 | 3/1994 | European Pat. Off. . |
| 0739909A1 | 10/1996 | European Pat. Off. . |
| 31 42 155 | 6/1982 | Germany . |
| 209 315 | 4/1994 | Hungary . |
| 212 809 | 11/1996 | Hungary . |
| WO 92/17511 | 10/1992 | WIPO . |
| 94/26790 | 11/1994 | WIPO . |
| 94/26791 | 11/1994 | WIPO . |

OTHER PUBLICATIONS

E.W. Brostow et al.: "Failure of Plastics", Ed. Carl Hanser, 1986, p. 321.

SPE Journal, May 1959, p. 402.

*Primary Examiner*—David W. Wu
*Attorney, Agent, or Firm*—Venable; John W. Schneller; Catherine M. Voorhees

[57] ABSTRACT

An ethylene polymer having a density greater than 959 kg/m3 and a resistance to slow cracking greater than 23 hours. A composition containing this polymer, hollow bodies obtained using at least one such ethylene polymer, and a process for the manufacture of said polymer.

7 Claims, No Drawings

HOLLOW BODIES MADE OF ETHYLENE POLYMER AND METHOD OF MAKING SAME

This is a continuation-in-part of application Ser. No. 08/630,959 filed Apr. 5, 1996 now abandoned and pursuant to 35 U.S.C. § 120, this application claims the benefit of the filing date of same.

BACKGROUND OF THE INVENTION

1. Field of Invention

The present invention relates to an ethylene polymer having a combination of properties which make it particularly well adapted to the manufacture of hollow bodies by extrusion- or injection-blow molding, and a composition containing a polymer of this type. The invention also relates to hollow bodies obtained using this ethylene polymer, as well as to a process for preparing this polymer.

2. Technology Review

It is known that ethylene polymers lend themselves well to the manufacture of hollow bodies by extrusion- or injection-blow molding. Among these polymers, the ethylene copolymers with (an) other α-olefin(s) are particularly well suited because they have both good mechanical properties and satisfactory resistance to cracking. However, their density is generally insufficient to allow a reduction in the weight of the hollow bodies without a loss of the mechanical properties and/or the resistance to cracking.

In order to eliminate this defect, it would be appropriate to increase the rigidity of the copolymers, which can be done by increasing their density. However, it is known that increasing the density generally leads to a reduction in the resistance to cracking (see for example "Failure of Plastics," E. W. Brostow, R. D. Corneliussen, Ed. Carl Hanser, (1986), p. 321, and *SPE Journal*, May 1959, p. 402). Consequently, it has proven difficult to produce, from ethylene polymers, hollow bodies of reduced weight which also have satisfactory mechanical properties and good resistance to cracking.

SUMMARY OF THE INVENTION

The present invention seeks to solve this problem by providing an ethylene polymer which has both high density and high resistance to cracking.

To this end, the present invention relates to an ethylene polymer having a resistance to slow cracking of greater than 23 hours and a density (d) expressed in kg/m³ such that $959 < d < 1.552 \times \ln \text{HLMI} + 959$, HLMI being the value of the melt index in g/10 min, measured at 190° C. in a 21.6 kg load according to the ASTM D 1238 standard (F conditions).

DETAILED DESCRIPTION OF THE INVENTION

Within the scope of the present invention, the resistance to slow cracking is measured according to the ASTM D 1693-70 standard (1988), A conditions, by immersing a plate, obtained according to the ASTM D 1928-90 standard by compression of the polymer, in an aqueous solution containing 10% by volume of nonylphenoxy-poly (ethyleneoxy)ethanol, at 50° C.

The resistance to slow cracking is expressed in hours.

For purposes of the present invention, ethylene polymers are intended to indicate the ethylene homopolymers as well as the ethylene copolymers with at least one comonomer chosen from among the α-olefins containing from 3 to 8 carbon atoms such as, preferably, 1-butene, 1-hexene and 1-octene.

The ethylene homopolymers as well as the ethylene copolymers with 1-hexene containing less than 0.5 molar % and more particularly less than 0.2 molar % of 1-hexene are particularly suitable.

The density of the ethylene polymers according to the invention is measured according to the ADTM D 4883-89 standard.

It is preferably greater than 960 km/m³.

The maximum value of the density of the ethylene polymers according to the present invention is not critical.

However, it is preferably less than or equal to 970 kg/m³.

The ethylene polymers according to the invention advantageously have a resistance to slow cracking of at least 25 hours.

In practice, the maximum value of the resistance to slow cracking is rarely higher than 150 hours.

Advantageously, the ethylene polymers according to the invention also have a melt fluidity index (high load melt index), HLMI, measured at 190° C. in a 21.6 kg load according to the ASTM D 1238 standard (F conditions) (1986), of at least 10 g/10 min, and in particular at least 15 g/10 min. Particularly preferred are ethylene polymers having a HLMI of at least 20 g/10 min. In general, the HLMI does not exceed 100 g/10 min, most often 70 g/10 min, and more particularly 50 g/10 min. The ethylene polymers having a low HLMI value, for example lower than 20 g/10 min, present in general a good resistence to slow cracking. Ethylene polymers having a HLMI value in the range of 15 to 40 g/10 min are especially preferred.

The ethylene polymers preferred according to the invention also have a dynamic viscosity, $\eta_-$, measured at a speed gradient of $100 \text{ s}^{-1}$ at 190° C. and expressed in dPa.s, which is less than 18,000 dPa.s, and more particularly does not exceed 17,000 dPa.s. Moreover, this viscosity is most often grater than or equal to 10,000 dPa.s. Furthermore, the swelling ratio $T_G$ of the ethylene polymer according to the invention is most often at least 1.3 and preferably at least 1.5.

Within the scope of the present invention, the swelling ratio is determined by extrusion of the polymer at 190° C., at a speed gradient of $100 \text{ s}^{-1}$, through a die with a length of 15 mm and a diameter of 1 mm, at a constant speed, and by measuring the displacement of the plunger required to extrude a 70 mm rod.

The swelling ratio is then calculated by the equation $T_G = 0.5707\sqrt{e}$, in which e represents the displacement of the plunger expressed in mm.

The cylinder and the plunger of the flow meter used for this measurement conform to the criteria of that used for the measurement of the flow index according to the ASTM D 1238 standard (1986).

The polymers according to the present invention which bring about the best results also have a resistance to cracking under stress of at least 20 hours and more particularly at least 25 hours.

Within the scope of the present invention, resistance to cracking under stress is measured according to the following operating mode.

Ten cylindrical bottles with a capacity of 0.5 gallon (1.9 liters) and a diameter of 11.5 cm, which have a distance of 15 cm from the bottom to the shoulder and a distance of 9 cm from the shoulder to the neck, are prepared by extrusion-blow molding of the polymer under consideration.

These bottles are then aged for 40 hours at the ambient temperature before being filled with an aqueous solution of 10% by volume of nonylphenoxy-poly(ethyleneoxy)ethanol in such a way that the meniscus of the liquid is situated at a distance of 2 cm from the bottom of the bottle.

These bottles are then pressurized at 2 psi (0.138 bar) with air, then sealed with an aluminum capsule and thermostatically controlled at 60° C.

Resistance to cracking under stress is defined as being the average of the amounts of time elapsed before the pressure inside the bottles drops to 0.1 psi (0.0069 bar).

In practice, the resistance to cracking under stress has most often proven to be less than or equal to 100 hours.

The ethylene polymers according to the present invention are particularly suitable for the manufacture of formed objects, and for the manufacture of hollow bodies by injection- or extrusion-blow molding, in particular.

In effect, they make it possible to obtain objects, and more particularly hollow bodies of low weight, which have both good mechanical properties and good resistance to cracking.

When they are used for the manufacture of formed objects, the ethylene polymers according to the present invention most often appear in the form of compositions containing one or more common additives such as for example antacids, antioxidants, UV blocking agents, colorants, nucleating agents or antistatic agents.

The quantity of each of these additives is usually 5 parts by weight at most, and preferably at least 1 part by weight at most, per 100 parts by weight of ethylene polymer.

Quantities less than or equal to 0.5 parts by weight per 100 parts by weight of ethylene polymer are particularly recommended.

Therefore, the present invention also relates to compositions containing at least 90% by weight of ethylene polymer as described above and more particularly at least 95% by weight of said polymer.

The compositions containing at least 98% by weight of ethylene polymer are particularly preferred.

The present invention also relates to the hollow bodies obtained using at least one ethylene polymer as described above.

The hollow bodies according to the invention are generally obtained in extrusion- or injection-blow molding processes in which a composition containing at least one ethylene polymer as described above is used.

The polyethylene-based compositions described above are particularly suitable.

The processes for manufacturing hollow bodies by extrusion or injection-blow molding which are advantageously usable according to the invention are well known to one skilled in the art.

They consist of the manufacture, by means of extrusion or injection, of a hollow body of molten material, generally called a preform, which is held between two half molds then inflated until it is pressed against the walls of the mold.

The hollow bodies preferred according to the invention advantageously have particularly low weight as well as high resistance to cracking and good mechanical properties.

Finally, the present invention relates to a process which is particularly suitable for the preparation of the ethylene polymer described above, which uses a chromium-containing catalytic solid deposited on a substrate.

This process consists of polymerizing the ethylene, possibly with one or more comonomers as defined above, in the presence of a chromium-containing catalytic solid deposited on a substrate which contains at least two constituents chosen from among silica (X), aluminum oxide (Y), and aluminum phosphate (Z), possibly in the presence of a co-catalyst.

The catalytic solid can be obtained in the known manner by impregnating a substrate powder with an aqueous or organic solution of a chromium compound, followed by a drying in an oxidizing atmosphere.

The chromium compound can be, for example, a salt which is soluble in aqueous media such as the oxides, acetate, chloride, sulfate, chromates and bichromates or a salt which is soluble in organic media such as acetylacetonate.

After impregnation, the substrate is usually activated by heating to a temperature from 400 to 1000° C. in such a way as to transform at least part of the chromium into hexavalent chromium.

The catalytic solid according to the invention can also be obtained by means of a mechanical mixing of the substrate with a solid chromium compound, for example chromium acetylacetonate, and preactivation at a temperature lower than the melting temperature of the compound before activation, as described above.

The quantity of chromium present in the catalytic solid is generally from 0.05 to 10% by weight, preferably from 0.1 to 5% by weight, and more particularly from 0.25 to 2% by weight relative to the total weight of the catalytic solid.

Advantageously, the substrate has a specific surface area (SS), measured according to the volumetric method BET (British standard BS 4359/1—1984), of at least 100 m$^2$/g, and in particular at least 180 m$^2$/g, with the values of at least 220 m$^2$/g being the most favorable. The SS is most often 800 m$^2$/g at most, more precisely 700 m$^2$/g at most, with values of 650 m$^2$/g at most being the most common.

In general, the substrate has a crystallization temperature of at least 700° C., such as for example at least 1000° C.

The crystallization temperature of the substrate is determined by subjecting a sample of the substrate to a heat treatment at different temperatures and by examining the sample by X-ray diffraction after each heat treatment.

Moreover, the porous volume of the substrate (VP) is usually at least 1.5 cm$^3$/g, with the values of at least 1.7 m$^3$/g being recommended.

The VP is generally 5 cm$^3$/g at most, in particular 4.5 cm$^3$/g at most, with the values of 4 cm$^3$/g at most being common.

The porous volume (VP) is the total of the porous volume constituted by the pores with radii less than or equal to 75 Å, measured by the nitrogen penetration method (BET) (British standard BS 4359/1—1984), and of the porous volume measured by the mercury penetration method by means of a porosimeter like the PORO 2000 marketed by Carlo Erba Co. (Belgian standard NBN B 05-202—1976).

The preferred substrates have an SS and a VP such that:

$$SS < (VP \times 564 - 358),$$

in which SS and VP are expressed in m$^2$/g and cm$^3$/g, respectively.

When the substrate contains only two of the above-mentioned constituents, it advantageously contains silica and aluminum oxide in a molar ratio of 0.01 to 99 (preferably 0.05 to 20), silica (X) and aluminum phosphate (Z) in a molar ratio of 0.01 to 99 (preferably 0.05 to 20), or aluminum oxide (Y) and aluminum phosphate (Z) in a molar ratio of 0.01 to 99 (preferably 0.05 to 20).

When the substrate contains silica (X), aluminum oxide (Y) and aluminum phosphate (Z), the molar percentage of these different constituents is generally such that (X):(Y):(Z) is (10 to 95):(0.5 to 80):(1 to 85), and more particularly such that (X):(Y):(Z) is (20 to 80):(0.5 to 60):(5 to 60).

The substrate may possibly also contain titanium.

The quantity of titanium, expressed in the molar percentage of $TiO_2$ relative to the substrate containing silica (X), aluminum oxide (Y), aluminum phosphate (Z) and $TiO_2$, is generally at least equal to 0.1 molar %, and preferably 0.5 molar %; values of at least 1 molar % are the most common.

This quantity most often does not exceed 40 mol. %, and more particularly 20 molar %, with values of 15 molar % at most being recommended.

The substrate most often appears in the state of a powder which has grains with a diameter from 20 to 200 μm. The apparent specific gravity of the substrate is most often greater than or equal to 50 kg/m³, and in particular 100 kg/m³; it is generally equal to a maximum of 500 kg/m³, and typically 300 kg/m³.

The apparent specific gravity is measured under free flow conditions according to the following operating mode: the powder of the substrate is poured into a 50 cm³ cylindrical receptacle without being close-packed, from a hopper whose lower edge is disposed 20 mm from the upper edge of the receptacle.

The receptacle, filled with the powder and leveled with the aid of rectilinear lath, is then weighed, the tare of the weight measured is deduced, and the result obtained (expressed in g) is divided by 50.

The substrate can be obtained according to a process which consists of mixing, in a first step, an alcohol, water, a silicon alcoholate and an acid in quantities such that the water/silicon molar ratio is from 2 to 50, and of adding to the hydrolysis mixture thus obtained, in a second step, an acid solution of an aluminum compound and a solution of a phosphate ion source, and in a third step, a precipitating agent for obtaining a precipitate which, in a fourth step, is washed in water then with an organic liquid, and dried, in a fifth step, by distillation until a powder which is calcined has been obtained.

The silicon alcoholate preferably includes an alkoxy grouping with 1 to 20 carbon atoms.

The silicon alcoholates which are well suited are silicon tetramethylate and silicon tetraisopropylate, and more particularly silicon tetraethylate.

The linear aliphatic alcohols, such as for example ethanol, isopropanol and methanol, are preferred. Advantageously the hydrocarbonic grouping of the alcohol corresponds to that of the alkoxy grouping of the silicon alcoholate used.

The first step is advantageously carried out at an acid pH and it comprises, on the one hand, the addition of water, acid, silicon alcoholate and alcohol at a temperature generally lower than or equal to 30° C., with temperatures higher than 0° C. being recommended, and on the other hand, the aging of the reaction medium at a temperature equal to at least 20° C. and lower than the boiling temperature of the medium (with temperatures from 40 to 80° C. being the most common and those from 50 to 70° C. being recommended), in such a way as to substitute at least part of the alkoxy groupings of silicon alcoholate with hydroxy groupings, without having a gelation or a precipitation of silicon occur.

In the first step, the pH of the reaction medium is generally lower than 3, and preferably from 0.5 to 2.5.

The acid used in the first step can be a mineral acid such as for example hydrochloric, nitric, phosphoric or sulfuric acid, or an organic acid.

Hydrochloric acid is particularly well suited.

Preferably, the aging is carried out at a temperature higher than that of the addition of the reagents.

The purpose of the aging is to allow a partial hydrolysis and condensation of the silicon alcoholate.

The second step of the particular process for obtaining the substrate consists of adding to the medium derived from the first step an acid solution of an aluminum compound and a solution of a phosphate ion source.

The aluminum compound can be chosen from among the inorganic aluminum salts and the aluminum alcoholates. The aluminum alcoholates containing non-substituted saturated linear aliphatic groupings, which preferably contain from 1 to 20 carbon atoms, and among them those whose alkoxy grouping corresponds to that of silicon alcoholate, are recommended. Aluminum nitrate and aluminum chloride are also suitable.

For purposes of the present invention, phosphate ion source is intended to indicate any compound capable of forming phosphate ions, especially the inorganic phosphatic salts, the phosphatic salt ethers and phosphoric acid.

In the second step of the process for obtaining the substrate, it is preferable to work very slowly in order to prevent the medium from heating up.

The temperature of the medium is generally lower than 30° C., typically lower than or equal to 20° C., for example between 0 and 10° C.

The third step consists of forming a precipitate under the influence of a precipitation agent which can be chosen from among all the compounds capable of inducing a coprecipitation of the reagents obtained in the previous steps, namely the hydrolyzed and partially condensed silicon alcoholate, the aluminum compound and the phosphate ion source, in the form of a mixed oxide of silicon, aluminum and phosphorus.

Ethylene oxide, ammonium carbonate and ammonium hydroxide may be cited as examples of precipitation agents.

Preferably, an aqueous solution of ammonium hydroxide is used.

The pH of the coprecipitation medium is generally greater than or equal to 5, and typically greater than or equal to 6; it is usually less than 11, with values less than 10 being recommended.

Preferably, the pH is kept constant for the duration of the coprecipitation.

The fourth step consists of washing the precipitate in water in order to-eliminate the impurities, followed by the elimination of at least part of this water by any appropriate means, such as filtration or preferably centrifugation.

Next, the precipitate is subjected to a washing by means of an organic liquid in order to eliminate the water from it.

The organic liquid preferably has a boiling point lower than 120° C., for example from 70 to 90° C.

The alcohols, the ethers or their mixtures, and among these the alcohols including from 1 to 4 carbon atoms, such as isopropanol, are quite suitable.

The washed precipitate is then subjected to a drying by means of atomization or distillation, preferably azeotropic, in order to evaporate the water and the organic liquid not previously eliminated, until a powder of the substrate is obtained.

The powder of the substrate is then subjected to a calcination, which is generally continued until the weight of the powder remains constant over time, while avoiding a crystallization of the powder.

The calcination can be carried out in air, preferably dry air, in a fluidized bed at a temperature lower than the crystallization temperature of the powder.

The temperature is generally from 300 to 1500° C., typically from 350 to 1000° C., and preferably from 400 to 600° C.

The catalytic solids preferred according to the invention contain from 0.05 to 10% by weight of chromium deposited on a substrate obtained according to the process described above which essentially contains silica (X) and aluminum phosphate (Z) in molar ratio from 0.6 to 1.5, and which can contain up to 10% by weight of aluminum oxide (Y). The ethylene polymers according to the invention are therefore advantageously obtained by the polymerization of the ethylene and possibly of a comonomer in the presence of a catalytic solid as described above.

This polymerization can be carried out in the presence of a cocatalyst, generally chosen from among the Lewis acids. The organoboric compounds are particularly well suited since they allow the obtainment of ethylene polymers which simultaneously have higher density, better resistance to cracking and greater processability.

The trialkyl boranes, whose alkyl chains include up to 20 carbon atoms, are most often preferred, and more particularly those whose alkyl chains are straight and include up to 18 carbon atoms, preferably from 2 to 8 carbon atoms. Triethylborane produces the best results.

The total quantity of cocatalyst used is generally from 0.02 to 50 mmoles per liter of solvent, diluent or reactor volume, and preferably from 0.2 to 2.5 mmoles per liter.

Moreover, this quantity is most often such that the molar ratio between the organoboric compound and the chromium present in the catalytic solid is at least 0.1 and more particularly at least 0.8.

This ratio is also favorably 20 at most and more particularly 10 at most.

A process which is particularly well adapted to the manufacture of the ethylene polymers preferred according to the invention consists of polymerizing ethylene, possibly in the presence of 1-hexene under the influence of a catalytic solid containing from 0.05 to 10% by weight of chromium deposited on a substrate essentially containing silica (X) and aluminum phosphate (Z) in a molar ratio from 0.6 to 1.5, which can contain up to 10% by weight of aluminum oxide (Y) and of an organoboric compound as a cocatalyst.

According to the invention, the polymerization of the ethylene can be carried out according to any known process, in solution in a solvent which can be olefin which is itself in a liquid state, or in suspension in a hydrocarbonic diluent, or even in a gaseous phase in one or more reactors in series.

Good results are obtained when the polymerization of the ethylene is carried out in a single reactor, preferably in suspension.

It is understood that the polymerization of the ethylene can be carried out in the presence of a transfer agent, such as hydrogen for example.

EXAMPLES

The following examples are intended to illustrate the invention.

The significance of the symbols used in these examples and, as necessary, the units which express the quantities mentioned and the methods for measuring these quantities are explained below.

HLMI=high load melt fluidity index of the ethylene polymer
d=density of the ethylene polymer
ESCR-A=resistance to slow cracking
$\eta$=dynamic viscosity of the polyethylene
$T_G$=swelling rate of the ethylene polymer
ESCR-CPBT=resistance to cracking under stress
COMP=measured compression index expressed in lb (0.453 kg) (ASTM D 2659 standard)

Example 1R

For Reference

In this example, an ethylene copolymer was prepared in a single reactor using a chromium catalyst on a silica substrate, and its mechanical properties, its density, and its resistance to cracking were measured.

The commercial catalyst EP30X from the Crosfield company, which includes 1% by weight of Cr supported on silica, was used.

The catalyst was calcined in a fluidized bed at 845° C. for 10 hours in dry air, and the catalytic solid was collected.

B. Polymerization of Ethylene in a Single Reactor

Isobutane, ethylene and 1-hexene in a 1-hexene/ethylene molar ratio of 0.015, as well as the catalytic solid obtained in A, were introduced into a polymerization reactor.

The total pressure in the reactor and the temperature were, respectively, 4 MPa and 102° C.

The polymer obtained had the following characteristics:
HLMI=20
ESCR-A=23
$\eta$=16,000
$T_G$=1.66
d=954.9
COMP=44.5
1-hexene content: <0.1 molar %

Bottles whose resistance to cracking under stress was measured according to the working mode described above were prepared by injection-blow molding.

The value obtained (ESCR-CPBT) was 16.4.

Example 2

In Conformity with the Invention

A. Preparation of the Catalytic Solid

A.1. An aqueous solution of hydrochloric acid IM was added to a solution of silicon tetraethylate and ethanol at a temperature of 10° C., in order to obtain a pH of 1. The quantities used were: 34.7 g of silicon tetraethylate, 41.7 g of ethanol, 18.9 g of water and 11.5 g of hydrochloric acid. Next, this reaction medium was subjected to an aging at 60° C. for two hours.

A.2. Simultaneously, an aqueous solution containing 62.5 g of hydrous aluminum nitrate, 17.1 g of an aqueous solution of 85% phosphoric acid, and 33.3 g of water was prepared, and was added to the reaction medium obtained in A.1, under vigorous agitation at 10° C.

A.3. The mixture obtained in A.2. was added to 500 g of an aqueous solution of ammonium hydroxide with a pH of 8, temperature-regulated at 10° C. while the pH was kept constant, in order to produce a precipitation, and the precipitate was subjected to an aging at pH 8, for 2 hours, under agitation and at 60° C.

A.4. The precipitate obtained in this way was washed in water and then with isopropanol.

A.5. The precipitate obtained in A.4 was dried by means of atomization until a powder was obtained.

A.6. The powder obtained in A.5 was calcined in a fluidized bed under dry air scavenging, for 4 hours at 500° C., in order to obtain a powder including 15.6% by weight of Si, 15.1% by weight of Al, and 16.4% by weight of P, which corresponds to the following general formula: $SiO_2$ $AlPO_4$.

A.7. The substrate obtained in A.6 was mixed with chromium acetylacetonate in a quantity such that the mixture would include 0.7% by weight of chromium. This mixture was then treated in a fluidized bed at 150° C. for 2 hours under dry air scavenging and was calcined in the fluidized bed at 600° C. for 10 hours in dry air.

B. Polymerization of Ethylene in a Single Reactor

Isobutane, ethylene, and hydrogen in a hydrogen/ethylene molar ratio of 0.032 and the catalytic solid obtained in A were continuously introduced into a polymerization reactor.

The total pressure in the reactor and the temperature were, respectively, 4 MPa and 106° C.

After granulation, the polymer obtained had the following characteristics:
HLMI=31.5
ESCR-A=37.6 h
$\eta$=16,700
$T_G$=1.6
d=960.6
COMP=56.1

This polymer's resistance to slow cracking, measured on flasks like those described above, was 30 hours.

So this ethylene polymer had, in addition to high density, high resistance to cracking and good mechanical properties; it was particularly well suited to the manufacture of hollow bodies of reduced weight by extrusion- or injection-blow molding.

Example 3

In Conformity with the Invention

In this example, Example 2 was duplicated at every stage, except that the polymerization of the ethylene was carried out at a temperature of 100° C., in the absence of hydrogen, by adding triethylborane to the polymerization medium in quantities such that the molar ratio of this compound to the chromium contained in the catalytic solid was 1.7.

The polymer obtained after granulation had the following characteristics:
HLMI=67.7
ESCR-A=66.7 h
$\eta$=10,300
$T_G$=1.77
d=961.7
COMP=52.3
ESCR-CPBT=45

Example 4

In Conformity with the Invention

Example 2 was duplicated, except that the catalytic solid was calcined (stage A.7) to a temperature of 815° C., hydrogen was not used in the polymerization, and the temperature of the reactor was 106.5° C.

The ethylene polymer after granulation was characterized by an ESCR-A of 26.8, an $\eta$ of 13,890, and a d of 963.8.

Example 5

In Conformity with the Invention

Example 5 was carried out by duplicating Example 3 at every stage, except that the temperature for the calcination of the catalytic solid (stage A.7) was 815° C. and the polymerization temperature was 103° C.

The ethylene polymer after granulation was characterized by an ESCR-A of 38, an $\eta$ of 10,350 and a d of 964.8.

It was observed that the polymers obtained in the presence of an organoboric compound had both a density and a resistance to cracking superior to that measured in the ethylene polymers obtained in the absence of this compound.

Moreover, their lower dynamic viscosity endows them with greater usability.

What is claimed is:

1. An ethylene polymer for the manufacture of a hollow body by extrusion- or injection-blow molding having a resistance to slow cracking greater than 23 hours and a density (d) expressed in kg/m$^3$ such that $959 < d < 1.552 \times \ln$ HLMI+959, HLMI being the value of the melt index in g/10 min, measured at 190° C. in a 21.6 kg load according to the ASTM D 1238 standard (F conditions), and further, the HLMI does not exceed 100 g/10 min.

2. The polymer according to claim 1, selected from the group consisting of ethylene homopolymers and ethylene copolymers with 1-hexene containing less than 0.5 mol. % of 1-hexene.

3. The ethylene polymer according to claim 1, having a high load melt index, HLMI, of at least 10 g/10 min.

4. The ethylene polymer according to claim 1, having a dynamic viscosity, $\eta$, of less than 18,000 dPa.s.

5. The ethylene polymer according to claim 1, having at least 20 hours of resistance to cracking under stress.

6. A composition containing at least 90% by weight of an ethylene polymer according to claim 1.

7. A hollow body obtained by extrusion- or injection-blow molding with at least one ethylene polymer for the manufacturing of a hollow body by extrusion- or injection-blow molding having a resistance to slow cracking greater than 23 hours and a density expressed in kg/m$^3$ such that $959 < d < 1.522 \times \ln$ HLMI+959, where HLMI is the value of the melt index in g/10 min., measured at 190° C. in a 21.6 kg load according to the ASTM D 1238 standard (F conditions), and further, the HLMI does not exceed 100 g/10 min.

* * * * *